June 25, 1957 R. H. PARK 2,796,914
HEAT SEALING DEVICE
Filed April 5, 1950

INVENTOR
ROBERT H. PARK
BY Parham & Bates
ATTORNEYS

United States Patent Office 2,796,914
Patented June 25, 1957

2,796,914

HEAT SEALING DEVICE

Robert H. Park, West Hartford, Conn., assignor to Emhart Manufacturing Company, a corporation of Delaware Application April 5, 1950, Serial No. 154,112

10 Claims. (Cl. 154—42)

The present invention relates to heat sealing of thermoplastic film and sheet material and more particularly to novel apparatus with which to effect superior heat sealing of thermoplastics such as polyethylene which are difficult to heat seal.

In order to seal two or more layers of thermoplastic film, they are pressed together between the sealing element and a cooperating pressing member whereupon heat supplied by the element serves to soften and bond together the film. Thereafter, the sealing pressure may be relieved and the sealed film removed. Preferably, however, the sealing pressure is maintained until the hot plastic at the seal has been cooled and set so that it will not separate when the sealing pressure is relieved.

It will be understood that, other factors being equal or superior, the less time required to effect a seal the more acceptable a heat sealer will be commercially. Therefore, it is important that the heating time and the cooling time be as small as possible and for that reason both rapid heating and forced cooling are indicated.

In order to heat certain thermoplastic films rapidly to sealing temperature and viscosity, the heating element must attain high temperatures which exceed the boiling point of water and of most other inexpensive coolants.

The pending patent application of Edward Boyd Gardner, Serial No. 127,718, filed November 16, 1949, now U. S. 2,719,567, discloses a thermoplastic heat sealer having a sealing element in the form of a hollow rod or tube.

Fluids may be passed through the tube with a view to promoting rapid cooling after sealing temperature has been attained.

However, if water is flowed continuously through the tube in sufficient quantity to prevent boiling, the tube remains at too low a temperature for sealing. If the water flow rate is reduced to the point where vaporization takes place, the water toward the exit end of the tube tends to be expelled, and it then becomes possible to heat that end of the tube. However, the inlet end of the tube remains cool, so that non-uniform sealing results.

Even if a liquid is used which does not boil at sealing temperature, it is not feasible to obtain uniform heating along the length of the tube, because the temperature of the liquid in the inlet must be at least no greater than the temperature to which it is desired to cool the tube during the cooling stage of the sealing cycle.

These problems can be overcome by supplying liquid coolant on an intermittent basis, i. e., once during each sealing cycle. However, to do so introduces certain elements of complexity, including the requirement of pumping, condensation and recirculation, if a liquid coolant is used, and excessive operating expense if a compressed gas is used as coolant.

The present invention provides a simple solution to the above problems and makes the use of continuously flowed liquids practicable for cooling hollow tubular sealing elements.

In accordance with the present invention, heating elements which are to be internally cooled by means of either a continuous or intermittent flow of coolant from temperatures above the boiling or flash point of the coolant, are internally coated with a layer of thermal insulating material which also may advantageously have electrically insulating properties when non-insulating coolants are used.

One advantage of the invention is that it provides for uniformity of sealing temperature along the length of the sealing element. Another advantage is that it provides a substantially uniform cooling rate along the length of the element.

These and other advantages of the invention are pointed out or will be apparent from the following description of embodiments of the invention which make reference to the accompanying drawing in which.

Figure 1:
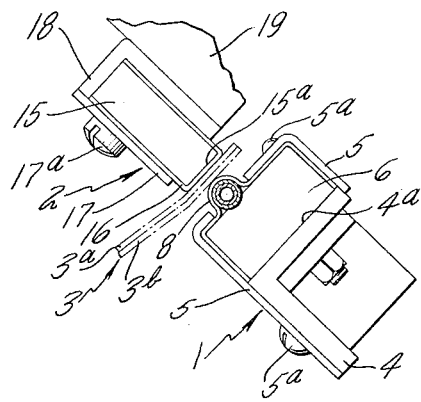
Figure 1 is a side elevational view partially in cross-section of a clamping and seal assembly having a water-cooled hollow tubular heating element embodying the invention.
Figure 2:
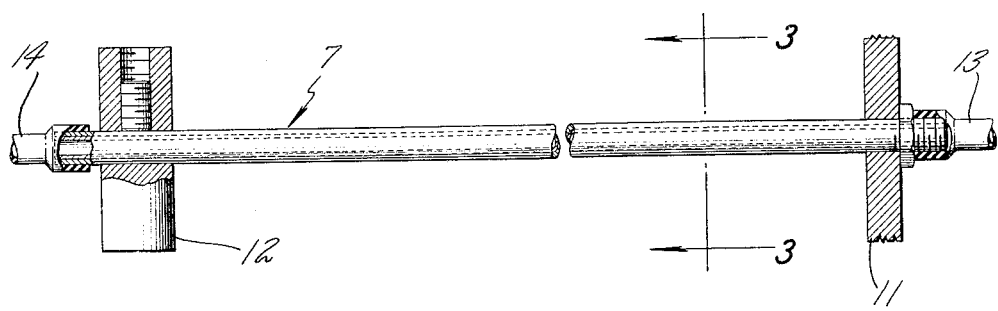
Fig. 2 is a plan view of the heating element shown in Fig. 1.

Referring to the drawings, there is shown a pair of clamping jaws 1 and 2 which may be moved relative to one another into and out of pressing engagement with two or more interposed layers 3a and 3b of thermoplastic film, generally designated 3, that are to be heat sealed. In the illustrated embodiment, it is contemplated that the jaw 2 may be moved out of clamping engagement with jaw 1 which is stationary, although it will be understood that either or both of the jaws may be movable between open and closed positions.

More particularly, the jaw 1 comprises a length of angle iron 4 which may be rigidly secured at its ends to suitable frame members of a housing (not shown). Mounted on outer surface 4a of the member 4, as by means of angle iron members 5 and screws 5a, is an insulating support 6 that is resistant to heat deterioration and that provides an electric and heat insulating backing for a heating element, generally designated 7, over which a polytetrafluorethylene or other non-adhering sheet or covering 8 is secured by the members 5.

Figure 3:
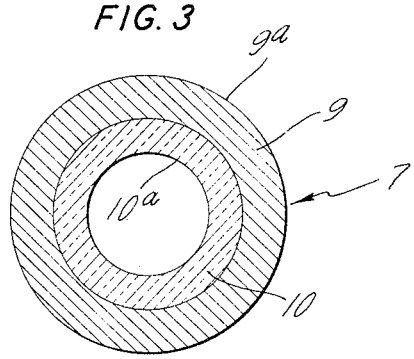
Fig. 3 is an enlarged cross-sectional view of the heating element taken on line 3—3 of Fig. 2.

Referring more particularly to Fig. 3, the heating element 7 is an elongated tubular member having an outer shell 9 formed of a material, such as steel, which offers a resistance to flow of electrical energy. Secured to the inner surface of the metal shell 9 is a layer 10 of enamel or other material which may be readily and strongly bonded to the shell 9 and which is a thermal insulating material having a suitably low coefficient of heat conduction.

The metal shell 9 of the element 7 is connected adjacent its ends across a source of electric current as, for example, terminal members 11 and 12 and can be heated to a selected temperature by suitable control of the current supplied thereto.

Water or other liquid is passed through the insulating lining 10 of the element 7 by means of supply and exhaust line connections 13 and 14, respectively.

The jaw 2, which is movable into and out of clamping engagement with the fixed jaw 1, may include a length 15 of rubber or other resilient material of rectangular cross-section. Surface 15a of the rubber member 15 also may be covered by polytetrafluorethylene sheet 16, which together with member 15 is secured by a plate 17 and screws 17a to an angle-iron support 18 that is carried at its ends by a pair of jaw actuating members, a portion of one of which is shown at 19.

The mechanism for actuating the members 19 to move the jaw 2 into and out of pressure sealing position relative to the jaw 1 and suitable means for controlling and regulating the electric heating current supplied to the element 1 may vary widely. For a more specific disclosure of suitable operating mechanisms and control circuits, reference may be made to the aforementioned patent application of Gardner. However, it should be understood that no particular mechanisms or control circuit is necessary to an understanding and practice of the present invention.

In operation, the layers 3a, 3b of thermoplastic film are inserted between the jaws 1 and 2 and the latter moved to closed position (Fig. 1) so as to clamp the film 3 under a firm heat-sealing pressure between the jaws.

Heat is supplied to the film along the line of pressure exerted by the jaws 1 and 2 through the cover 8 from the outer surface 9a of the shell 9. Preferably the outer shell surface 9a of the heating element 7 is preheated to a preselected temperature prior to or at least by the time the jaws 1 and 2 establish sealing pressure of the film 3.

The temperature preselected is one which will raise the contacting surfaces of the film layers 3a and 3b to a bonding temperature as rapidly as possible without heating the film nearest the element 7 to a point at which it deteriorates.

Where successive sealing operations are being made and rapidity is desired, heating of the element 7 to establish the preselected temperature at its outer surface 9a, preferably is initiated immediately after opening of the jaws 1 and 2 and removal of the film 3 following completion of the preceding sealing operation.

The temperature of the element may be thermostatically controlled so that the outer surface of the shell 9a does not exceed the preselected maximum. In addition, the current supplied to the heating element may be thermostatically regulated so as to maintain the outer surface 9a of the element at the preselected temperature until sufficient heat has been transferred to the film 3 so that the contacting surfaces of the layers 3a and 3b will attain bonding temperature before they cool below that temperature.

Flow of current through the element 7 is stopped when the necessary amount of heat has been supplied. Thereupon, the water or other coolant in the lining 10 removes the necessary heat to cool the element 7 and the film 3 below the bonding or plastic temperature and sets the seal.

An important feature of the sealing element 7 and its method of operation is that the enamel lining 10 provides for the establishment of a wide temperature gradient between the outer or plastic heating surface 9a of the element and inner surface 10a contacted by the coolant. Thus, though the outer surface of the element is maintained at a high temperature, for example 500° F., the surface 10a contacted by the coolant can be maintained at temperatures below 200° F. by the liquid coolant.

It is contemplated that the coolant be circulated continuously through the element 7 so as to aid in establishing a regular and repetitive time-temperature curve and to avoid irregular and chaotic heating and cooling rates.

The invention also contemplates stopping the flow of coolant through the element during heating and resuming circulation only to cool the element and set the seal.

It will be understood that the coolant may be drained from the element during the heating portion of the sealing cycle and the coolant only supplied at timed intervals coordinated with deenergizing of the element and initiation of the seal cooling and setting portion of the sealing cycle. If this latter practice is followed, it is preferable that the heating period be sufficiently short so that the sealing temperature can be established at the exterior of the element while, because of the low rate of heat transfer through the lining, the lining surface contacted by the coolant remains below the vaporizing temperature of the coolant.

Heating elements embodying the invention preferably are cooled by a rapidly flowing coolant so that the coolant has virtually no temperature drop longitudinally of the element and a substantially uniform temperature and cooling rate exists at all points throughout its length.

I claim:

1. A heat sealing element comprising a member having a known heat conductivity coefficient and having a passageway therethrough, means for supplying coolant to said passageway, means for directly heating said member and a lining in said passageway having a lesser heat conductivity coefficient.

2. A heat sealing element consisting of a hollow member having high heat conductivity and electrical resistance coefficients and having an internal chamber for coolant, means for supplying electric current to said member of a character to directly heat said member, and a lining for said chamber formed of a material having a lesser heat conductivity coefficient than said hollow member.

3. A heat sealer for organic thermoplastic material including means for applying pressure on layers of thermoplastic material which are to be heat sealed, a hollow electric heating element for supplying heat by conduction to the material to which pressure is applied, means for periodically supplying electric current to said element of a character to directly heat said element, means for supplying coolant internally to said element, and a liner intermediate said coolant and said element formed of material having a lower heat conductivity coefficient than said element.

4. A heat sealer for organic thermoplastic material including means for applying pressure on layers of thermoplastic material which are to be heat sealed, a heating element having high heat conductivity and electrical resistance for supplying heat to the material to which said pressure is applied, means for cooling said element, means for periodically supplying electric current to said element of a character to directly heat said element, and insulating material having a lower heat conductivity coefficient than said element and located intermediate said element and said cooling means.

5. In a device for heat sealing together layers of organic thermoplastic materials, an electric heating element having high heat conductivity and electrical resistance coefficients, means for supplying electric current to said member of a character to directly heat said member, a liquid coolant passage in said element, an electric insulation lining for said element having a lower coefficient of heat conductivity than said element, and means for supplying a liquid coolant to the interior of said lining while said element is receiving electrical energy.

6. A machine for heat sealing thermoplastic films comprising, in combination, a sealing member and a pressure member, said sealing member comprising a metal tube, means for intermittently applying an electrical potential between two spaced points on said tube thereby to heat the portion of the tube between said points to heat sealing temperatures, means for introducing coolant fluid into the tube at one end thereof and for discharging such fluid therefrom at the other end thereof thereby to withdraw heat from said tube, and means for displacing said sealing and pressure members towards each other to apply sealing heat and pressure upon the films interposed therebetween.

7. A machine for heat sealing thermoplastic materials comprising, in combination, a sealing member and a pressure member, said sealing member comprising a base and a metal tube insulatedly mounted on said base, a pair of terminal members mounted on respective terminal regions of said tube through which said tube may be interposed into an electrical circuit to heat it to heat sealing temperatures by the passage of electrical current pulses therethrough, intake and outlet means respectively associated with the ends of said tube to establish a flow of coolant fluid through the inner space thereof, and means for displacing said sealing and pressure members towards each other to apply sealing heat and pressure upon the layers of thermoplastic material interposed therebetween.

8. A machine for heat sealing thermoplastic materials comprising, in combination, a sealing member and a pressure member, said sealing member comprising an insulative base and an elongated tube formed of metal of high specific resistivity mounted on said base, terminal members for said tube for interposing at least a portion of the length of said tube in an electrical heating circuit, a conduit for connecting one end of said tube to a source of coolant fluid under pressure to introduce coolant fluid into the tube at said end and to discharge such fluid from the tube at the other end thereby maintaining a flow of coolant fluid through the tube, and means for displacing said sealing and pressure members towards each other to apply sealing heat and pressure upon the layers of thermoplastic material interposed therebetween.

9. A heat sealing machine of the thermal impulse type comprising, in combination, a sealing member and a pressure member, said sealing member comprising a base and a metal tube mounted on said base, means for interposing at least part of the length of said tube into an electrical pulse generating circuit to intermittently heat it to heat sealing temperatures, a conduit for connecting one end of said tube to a source of coolant fluid, said conduit being formed of an electrical insulating material whereby said tube and said source are effectively connected for coolant fluid flow but are electrically disconnected from each other, and reciprocating means for said sealing and pressure members.

10. A heat sealing machine of the thermal impulse type comprising, in combination, a sealing member and a pressure member, said sealing member comprising a base and a metal tube mounted on said base, terminal members for said tube for interposing at least a portion of the length thereof in an electrical heating circuit, conduit means for the ends of said tube for maintaining a flow of coolant fluid through the tube, at least a portion of said conduit means being made of elastically deformable material to cushion pressure surges produced in said flow, and reciprocating means for said sealing and pressure members.

UNITED STATES PATENTS

References Cited in the file of this patent

| | | |
|---|---|---|
| 2,092,144 | Sticelber | Sept. 7, 1937 |
| 2,289,618 | Young | July 14, 1942 |
| 2,312,993 | Stephens | Mar. 2, 1943 |
| 2,326,931 | Dalton et al. | Aug. 7, 1943 |
| 2,460,460 | Langer | Feb. 1, 1949 |
| 2,466,735 | Piazze | Apr. 12, 1949 |
| 2,469,972 | Lowry et al. | May 10, 1949 |
| 2,476,283 | Castellan | July 19, 1949 |
| 2,509,439 | Langer | May 30, 1950 |
| 2,574,094 | Fener et al. | Nov. 6, 1951 |
| 2,582,581 | Bona | Jan. 15, 1952 |
| 2,606,987 | Winstead | Aug. 12, 1952 |

FOREIGN PATENTS

| | | |
|---|---|---|
| 36,927 | France | May 20, 1930 |